Oct. 28, 1924.
B. B. WATERMAN
1,512,959
SHANK MAKING MACHINE
Filed Sept. 12, 1921
5 Sheets-Sheet 3
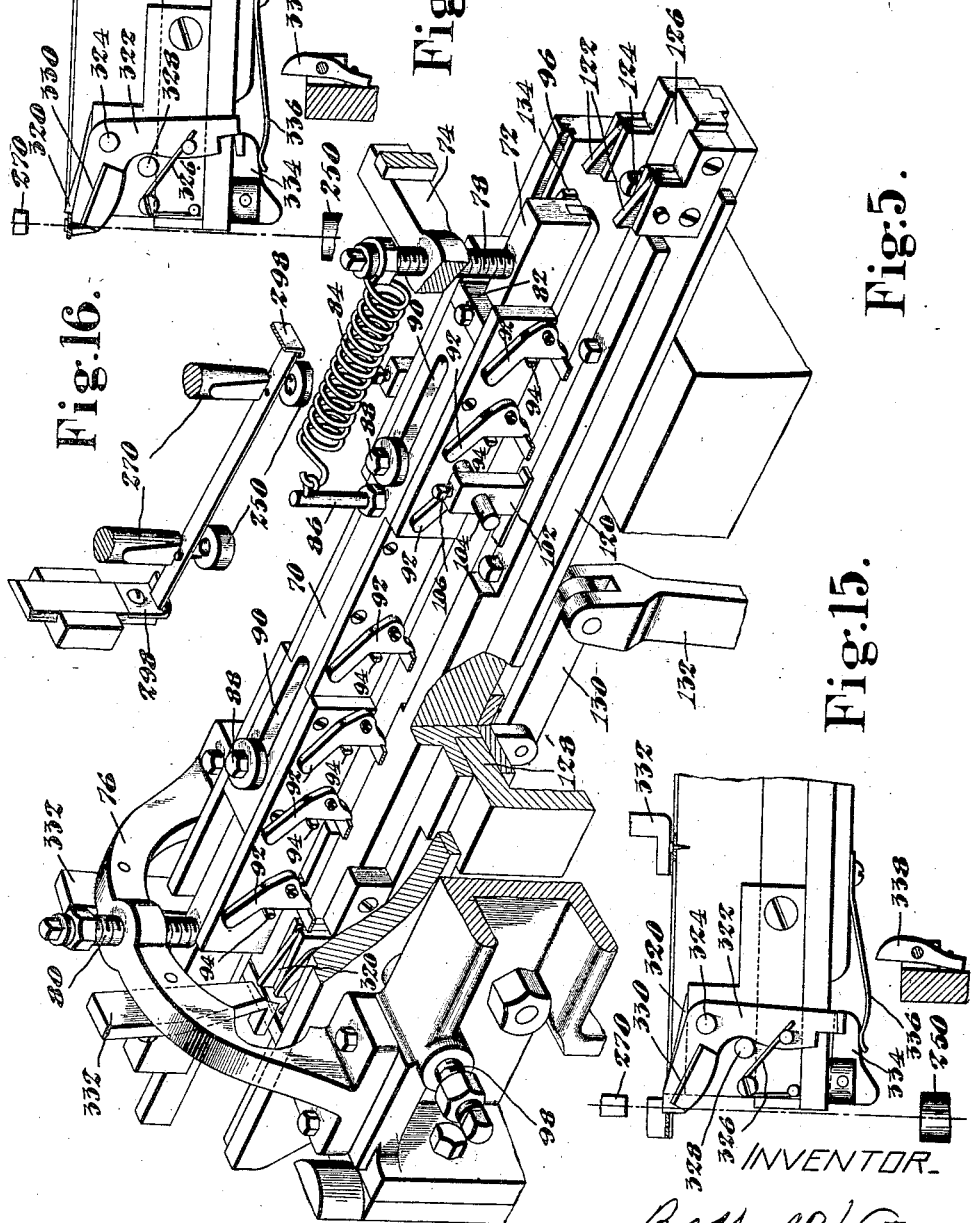

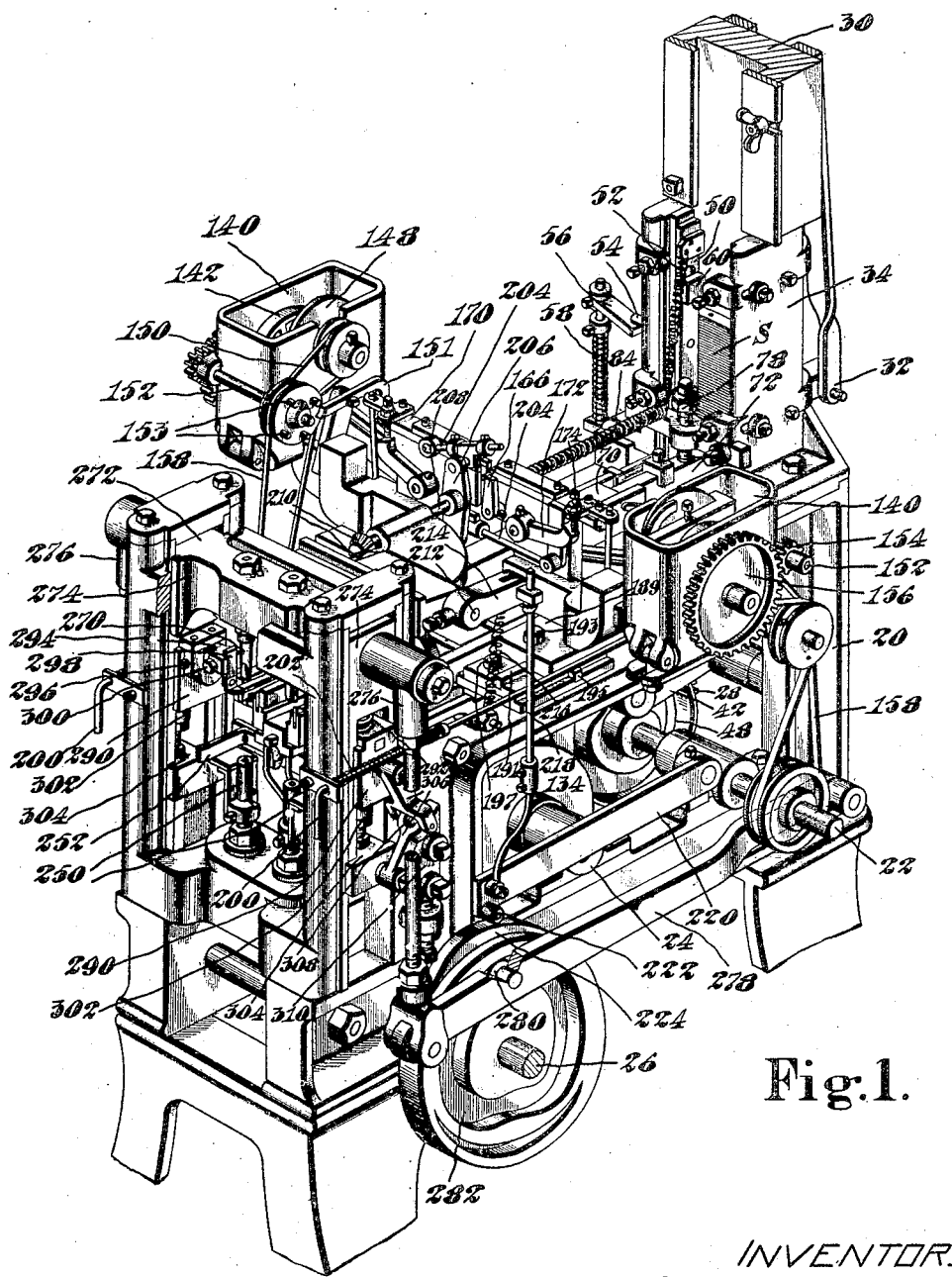

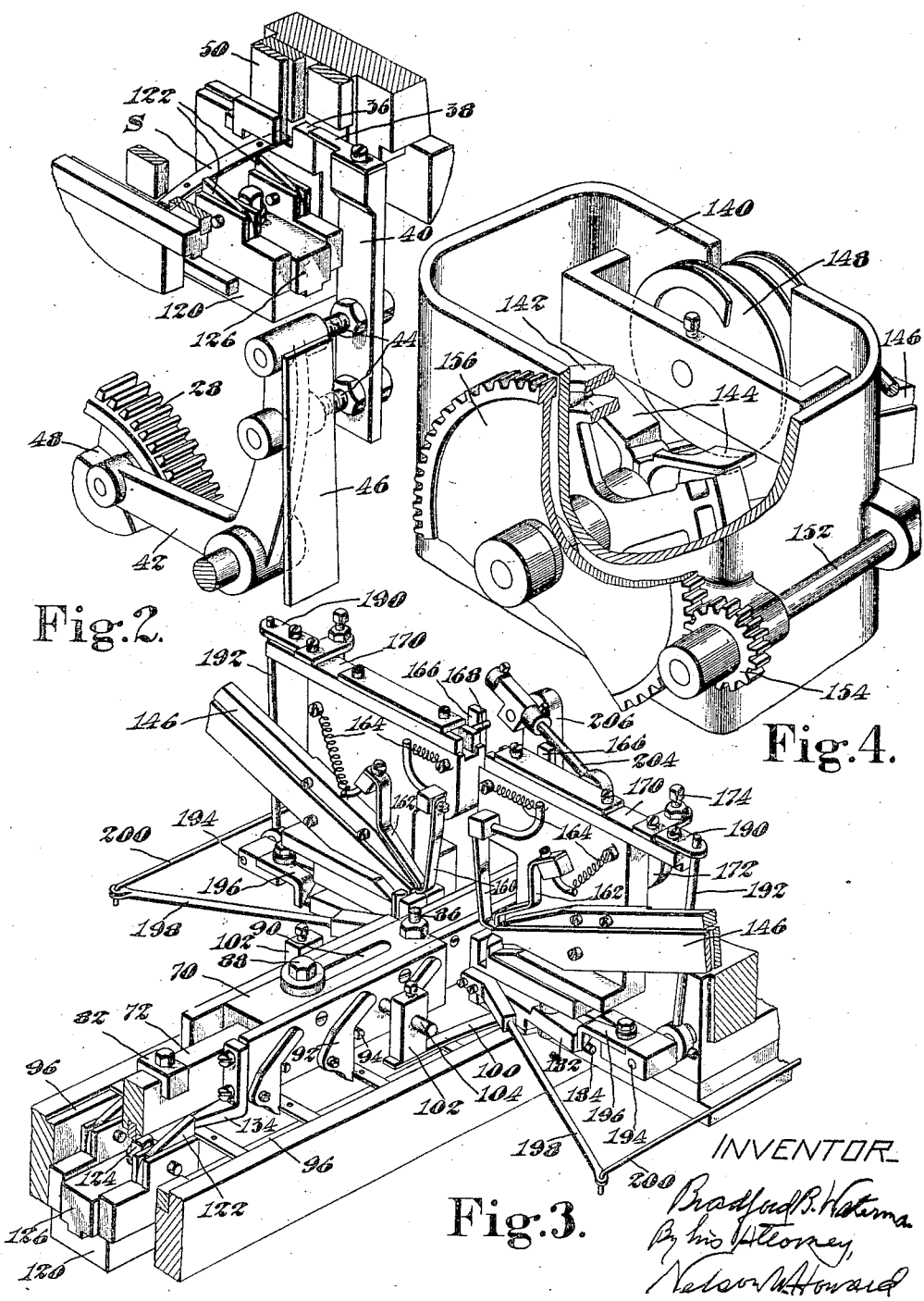

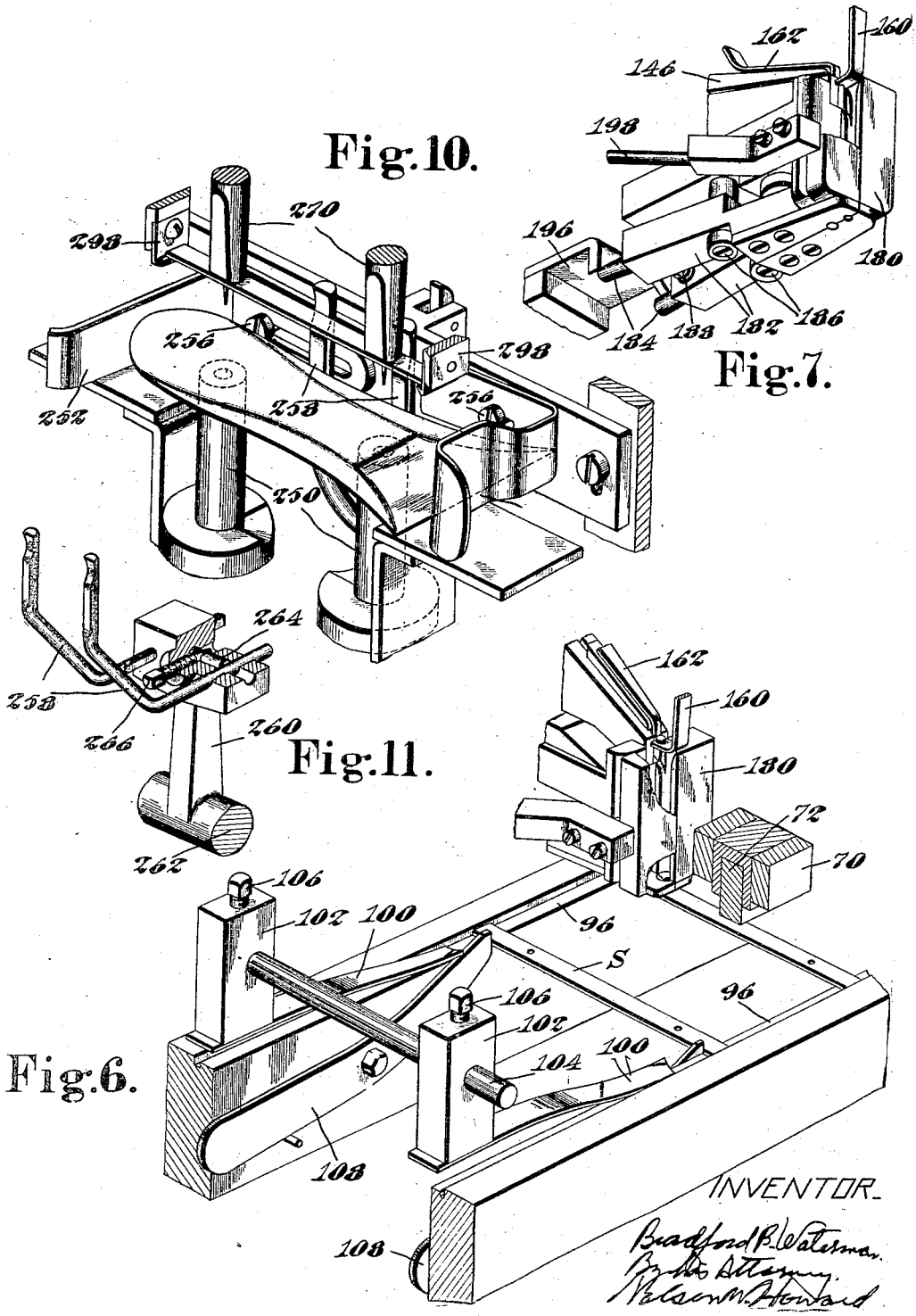

Oct. 28, 1924.

B. B. WATERMAN

SHANK MAKING MACHINE

Filed Sept. 12, 1921

INVENTOR.
Bradford B. Waterman
By his Attorney
Nelson W. Howard

Patented Oct. 28, 1924.

1,512,959

UNITED STATES PATENT OFFICE.

BRADFORD B. WATERMAN, OF BRIDGEWATER, MASSACHUSETTS, ASSIGNOR TO UNITED SHANK & FINDINGS COMPANY, OF BOSTON, MASSACHUSETTS, A CORPORATION OF MASSACHUSETTS.

SHANK-MAKING MACHINE.

Application filed September 12, 1921. Serial No. 500,164.

*To all whom it may concern:*

Be it known that I, BRADFORD B. WATERMAN, a citizen of the United States, residing at Bridgewater, in the county of Plymouth and State of Massachusetts, have invented certain Improvements in Shank-Making Machines, of which the following description, in connection with the accompanying drawings, is a specification, like reference characters on the drawings indicating like parts in the several figures.

This invention relates to machines for assembling fastenings and blanks, and is illustrated as embodied in a machine of the same general organization as the machine shown in Letters Patent No. 1,140,423, granted May 25, 1915, on an application filed by me, for making shank stiffeners for shoes. An object of the invention is to improve machines of this general type, as hereinafter explained, but it is not the intention to limit the invention to such machines, as in various aspects it is adapted for general use.

Machines of this character usually comprise a magazine for perforated steel stiffeners, a device to separate single stiffeners therefrom, intermittently-operated means to advance a succession of the separated stiffeners through the machne, means to introduce tacks into the perforations in the stiffeners, and drivers to drive the tacks into pieces of leather-board placed on suitable tack-clinching anvils.

To avoid waste of leatherboard and stiffeners, it is necessary to avoid the completion of the driving action when for any reason a stiffener fails to receive a tack in each perforation. It is not desirable to stop the machine for such a temporary failure in the tack feed, usually due only to the feeding of a single imperfect tack, and accordingly there have previously been proposed safety mechanisms of several different types, acting either to eject a stiffener before reaching the drivers if it fails to receive both tacks, or to eject the leatherboard or prevent its presentation on the anvil when such a stiffener is fed forward. In the first case the stiffener, and usually one tack, fall down through the operating mechanism of the machine, where they are in an inconvenient position for removal, and there is moreover the possibility of the tack being jarred from the stiffener during its ejection and falling into some of the operating mechanism and jamming it. If the leatherboard is acted upon, and a stiffener is presented with a tack in one end but not the other, the driver will clinch the tack, not only spoiling the tack but necessitating removing it by hand to salvage the stiffener.

A feature of this invention is to be found in an improved safety device which obviates these difficulties, and which achieves this result by operating, when a stiffener is presented which has one or both tacks or equivalent members missing, to present the stiffener out of alinement with the drivers, so that the driving stroke is idle so far as concerns the tack, if one be present. In such a case the stiffener and leatherboard may be ejected together and can readily be separated from completed shank pieces. As illustrated, this device comprises separate feed members which present the stiffener out of alinement with the drivers, and which are pressed down to an inoperative position and held there by a catch or detent if both tacks are present so that regular feed members may act.

In another aspect my invention comprises the provision of greatly simplified means for introducing fastenings, illustrated as tacks, into the perforations in blanks such as stiffeners which are presented thereto, and which is capable of accurate adjustment for various sizes of blanks. In the illustrative embodiment of this means, thin fingers push the stiffener blanks successively along ways to a position under two-part tack-centering chutes or jaws, to which tacks are delivered singly by escapements from supply raceways, with shanks extending through the perforations, as each successive blank pauses during the intermittent feed. Thereafter the chutes or jaws are opened and the heads of the tacks are released. While the blanks are again being advanced, the escapements separate further fastenings for the chutes. By adjusting the position of the fastening inserting means relatively to the position to which the blanks are advanced by the feed of the fingers, the blanks are positioned exactly under the chutes, and the dropping of the tacks into the perforations takes place so accurately, and with so little possibility of failure or jamming, that this type of fastening-inserting mechanism seldom fails in practice unless imperfect tacks are supplied to it. The arrangement is extremely simple as compared with the multiple raceways previously employed because of the uncertainty of accurate insertion of the tacks, and has a precision of action never achieved in previous devices which attempted positively to place the tacks in the perforations of the stiffeners.

The thin pusher or feed fingers are preferably twisted slightly laterally so that they will feed accurately blanks which are somewhat warped or twisted, or which do not have edges which are entirely square. This is desirable for the reason that in making the stiffener blanks, if the shear knives are too dull they will sometimes bend or bevel the edges of the stiffeners.

An important feature of my invention is to be found in the provision of means manually controlled from the front of the machine for opening the chutes to clear them out if they become clogged by imperfect fastenings.

Further features of my invention are to be found in means for feeding the blanks smoothly from the ways on to the supports on the driving head, and in various combinations and details of construction which will be evident from the following description of the illustrative embodiment of my invention shown in the accompanying drawings, in which Fig. 1 is a perspective showing the general organization of the machine;

Fig. 2 is a view of the means for separating a single stiffener from the magazine;

Fig. 3 is a perspective of part of the tack feeding mechanism from the opposite side from that shown in Fig. 1;

Fig. 4 is a view partly broken away of a hopper for feeding tacks into one of the raceways;

Fig. 5 is a perspective, partly broken away, showing the slides for advancing the stiffeners through the machine;

Fig. 6 is a detail view showing the feeding means for placing a stiffener under the tack raceway;

Fig. 7 is a detail perspective showing the underside of one of the tack chutes with its associated escapement;

Fig. 10 is a perspective showing the anvils and the associated adjustable gages;

Fig. 11 is a detail view showing the method of adjusting the ejector gages;

Figs. 14 and 15 are partial side elevations corresponding to Figs. 12 and 13, respectively, and Fig. 16 is a view corresponding to Fig. 13 but with the drivers near the end of their stroke.

Figures 8, 12:
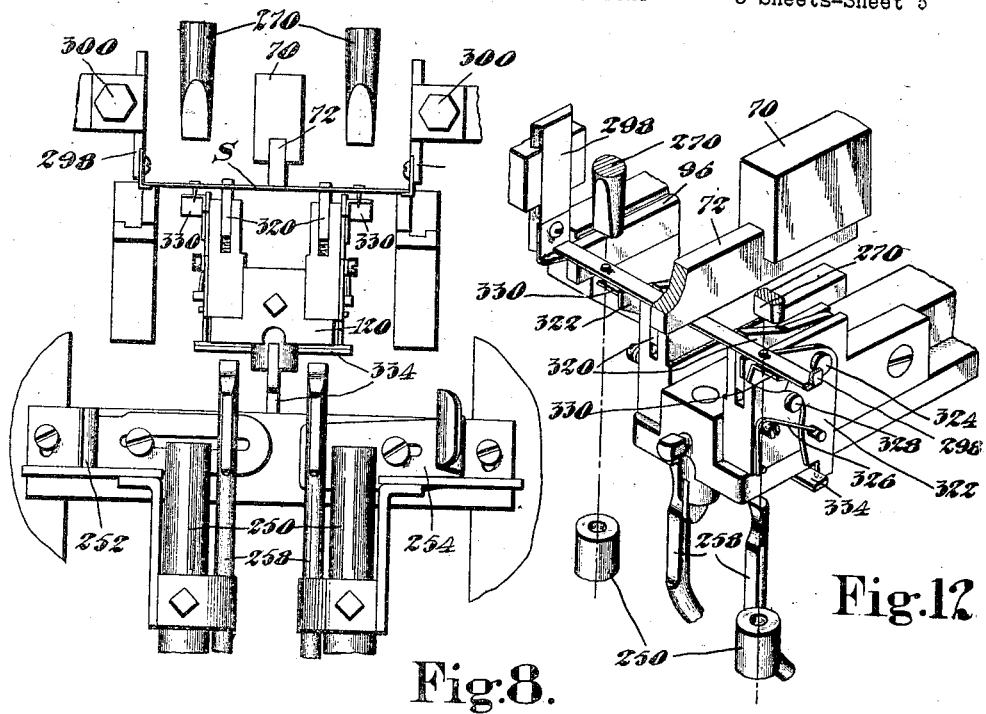
Figs. 8 and 9 are partial front elevations showing the drivers in different positions.
Figs. 12 and 13 are views showing the relation of a stiffener to the drivers and the anvils when it has two tacks in the perforations and when one of the tacks is missing.

The machine comprises a suitable frame 20 in which is journaled a main shaft 22 driven by a suitable pulley (not shown) on the opposite end of the shaft from that which appears in Fig. 1. Shafts 24 and 26 carry intermeshing gears driven by a gear 28 on shaft 22. The various moving parts of the machine are operated from one or the other of these three shafts.

The perforated steel stiffeners S are supplied to the machine in an upper magazine 30 pivotally mounted at 32 to permit it to be swung back to be refilled. From this upper magazine they settle by gravity into a lower magazine 34, the lowermost stiffener resting with its left hand end in the position shown in Fig. 2 but with its right hand end resting on a ledge 36. A finger 38 reciprocates across the ledge 36 to push the right hand end of the lowermost stiffener into the position shown in Fig. 2, the left hand end of this stiffener still being held underneath the stack of stiffeners in the magazine and serving as a fulcrum about which the lowermost stiffener is pivoted when pushed forward by finger 38. This finger is carried on an arm 40 connected to a bell crank lever 42 by threaded connections 44 which permit lateral adjustment of the finger 38 according to the adjustment of the magazine 34 as described in above-mentioned Letters Patent No. 1,140,423. The bell crank lever 42 is rocked forward by a leaf spring 46 and is rocked backward against the pressure of this spring by a cam 48 on shaft 22. The track in cam 48 is wider than the diameter of the cam roll carried by bell crank 42 so that the forward rocking movement of the bell crank lever is effected yieldingly by the spring 46, cam 48 acting like an edge cam instead of in the manner usual with face cams.

When the stiffener is in the position shown in Fig. 2 a slide 50 is yieldingly placed thereagainst by a coil spring 52 (Fig. 1) which holds it until the left hand end of the stiffener has been fed forward even therewith. The slide 50 has attached thereto a lug 54 which is engaged and raised at that time by an arm 56 which is lifted by a suitable cam against the tension of a spring 58. The slide 50 is held in place by a bolt and slot connection 60.

After a stiffener has been separated from the stack in the magazine as above described, it is fed intermittently through the machine by an upper slide 70 and a lower slide 120 shown in Figs. 2, 3 and 5. The upper slide reciprocates on a bearing member 72 which is vertically adjustable relatively to supports 74 and 76 by turning the threaded connections 78 and 80. The bearing member 72 has fastened thereto an abutment 82 which limits the reciprocation of slide 70 toward the magazine. A spring 84 is connected at one end to the threaded connection 78 and at the other end to a pin 86 fastened to slide 70, yieldingly to hold the slide against the abutment 82. The slide 70 is connected to the bearing member 72 by bolts 88 passing through slots 90 in the slide.

The upper slide 70 carries a number of pivoted pawls 92 held by gravity against stop pins 94, so that on the rearward or idle reciprocation they will be swung upwardly to clear the stiffeners while on the forward or feeding reciprocation they will engage the stiffeners and push them forward. During this intermittent forward feeding the stiffeners are supported on ways 96 and are bowed down in the middle sufficiently by engagement with the bearing member 72, which is suitably adjusted in a vertical direction to bring this about, so that they are under enough tension to prevent any tendency to move backward along the ways on the idle stroke of slide 70. Ways 96 may be adjusted laterally for stiffeners of different lengths by turning the adjustable threaded connections 98. The parts described above may be, and are illustrated as being, the same as corresponding parts in the above-identified Letters Patent.

In order to provide an accurate and adjustable feed to position the stiffeners relatively to the tack-introducing means, the present invention provides, in addition to the pawls 92, two feed fingers 100 of spring steel on the slide 70 which, as hereinafter explained, push the stiffeners with great accuracy successively under the tack chutes. These fingers are secured to blocks 102 which are clamped to a rod 104 carried by slide 70 by means of set screws 106 so that they may be adjusted laterally to correspond to the adjustment of the ways 96. As shown in Fig. 6, gravity pawls 108 guard against the possibility of the spring pressure of fingers 100 being sufficient to drag a stiffener backward on the ways 96 on the idle reciprocation of slide 70. In accordance with one feature of my invention, the forward ends of the fingers 100 are twisted upwardly from the horizontal on the inner sides so that they will engage a stiffener and feed it properly even if its edge is not precisely perpendicular to ways 96. In the manufacture of stiffeners such as are used in this machine, if the shearing knife which cuts them from a strip of metal becomes somewhat dull, it sometimes twists or bevels the edge of the stiffener slightly instead of cutting it off square and if the ends of fingers 100 were not twisted they would tend to override such a stiffener instead of feeding it forward.

As shown more particularly in Fig. 5 the stiffeners are advanced from the position shown in Fig. 2 to within reach of the pawls on slide 70 by spring pawls 122 which are mounted on lower slide 120 by a bolt 124 passing through a slot in block 126 which carries the pawls. The slide 120 is dove-tailed on ribs 128 on the frame of the machine and is reciprocated through link 130 by an arm 132 which is oscillated by a cam 134 (Fig. 1). On the forward reciprocation of slide 120 after the pawls 122 have picked up a stiffener as shown in Fig. 2, one of these pawls engages an abutment 134 on slide 70 and pushes that slide forward during the remainder of its stroke, against the tension of spring 84. As will be hereinafter explained, the slide 120 also carries the pawls which deliver the stiffeners to the driving mechanism.

As is usual in fastening-inserting machines, the tacks are contained in hoppers 140 and are raised by elevating wheels 142 therein from which they fall on guides 144 (Fig. 4) which direct them to raceways 146. Disks 148 clear the raceway of tacks which do not enter it properly, being driven by belts 150 from shafts 152 which carry gears 154 meshing with gears 156 which turn the elevating wheels 142. Shafts 152 are driven by belts 158 from pulleys on the above-described drive shafts. Spring held bell crank levers 151 are pounded against the raceways by cam pins 153, to jar the tacks downwardly therein.

To provide dependable means for feeding tacks to the chutes at suitable intervals, my invention provides, at the bottom of each raceway 146, an escapement made up of fingers 160 and 162 mounted on rock shafts and held against the raceway 146 by coil springs 164 as shown in Fig. 3. At the opposite end of each rock shaft which carries a finger 160 is an arm 166 arranged to be engaged by a pin 168 on a reciprocating slide 170. On the opposite end of each rock shaft which carries a finger 162 is an arm 172 (Fig. 1) at the end of which is a cam surface arranged to be engaged by a vertically adjustable set screw 174 on the corresponding slide 170. By comparing Figs. 1 and 3 it will be seen that when slides 170 move toward the center of the machine the fingers 162 will be lifted from the raceways 146, and when the slides 170 return toward the outside of the machine these fingers will be returned by springs 164, while fingers 160 will be lifted through engagement of arms 166 by pins 168. These alternate motions of the escapement fingers release the tacks one at a time from each raceway, through centering jaws or chutes 180, into perforations in the stiffeners.

Immediately below the end of each raceway, and in a position to receive the tacks as they are released therefrom, is a chute or jaw 180 one of which is shown in detail in Figs. 6 and 7. This chute is made in two parts carried by levers 182, each of which has a bearing pin 184 at the end opposite the chute. Levers 182 are mounted on pivots 186 and are held together by a spring 188 so that the chute is normally closed. As shown in Fig. 3 when the slides 170 are reciprocated, perforated plates 190 carried thereby rock arms 192 to turn rock shafts 194. Carried by these rock shafts are claw shaped cam plates 196 which engage the bearing pins 184 and press them together against the tension of springs 188 to open the chutes or jaws 180 and allow the heads of the tacks held thereby to drop through to seat against the perforations in a stiffener supported beneath the chutes on the ways 96 (see Fig. 6). As shown in Fig. 6, when a tack is released by finger 160, the shank is guided by the bottom opening, in jaw 180 (which is made conical for that purpose) directly through a perforation immediately therebeneath. As the shank has thus entered the perforation before the jaw opens to release the head, there is no tendency for the opening of the jaw to displace the tack relatively to the perforation.

The present invention provides for adjusting the fastening inserting means relatively to the blank-feeding means by mounting each hopper, raceway, escapement, and chute on a plate 189 (Fig. 1), movable longitudinally of the machine on a tongue and groove connection 191 relatively to a second plate, which is mounted for movement laterally of the machine on a tongue and groove connection 195 relatively to a plate carried by the frame of the machine. Plates 189 are clamped in adjusted position by bolts 193 and 197. The adjustment laterally of the machine is for stiffeners having perforations at different distances apart, and the adjustment longitudinally of the machine is to provide for inserting tacks in the perforations of stiffeners of different widths.

These adjustments are of great importance, not only to adapt the machine to handle blanks of different sizes, and with perforations differently positioned, but also to permit careful centering of the tack-dropping chutes exactly over the positions of the perforations in the blanks.

According to an important feature of the invention, there is attached to one of each pair of levers 182 an arm 198 which can be operated from the front of the machine by a pull rod 200 against the tension of a spring 202. If the chute becomes clogged by imperfect tacks or otherwise the operator can clear it by pulling on the rod 200 without leaving his position.

Slides 170 are reciprocated by adjustable pitmen 204 operated by a lever 206 on rock shaft 208 driven through bevel gears 210 and rock shaft 212 by a lever 214. Lever 214 is oscillated downwardly by coil spring 216 and upwardly by rod 128 pivotally mounted on lever 220 which carries a cam roll 222 engaging an edge cam 224. By this arrangement each revolution of shaft 26 produces one complete reciprocation of the slides 170, releasing a tack from each of the chutes 180, and delivering another tack to each of these chutes.

The leatherboard shank pieces to which the stiffeners are to be tacked are placed by the operator on the tack clinching anvils 250 where they are positioned by end gages 252 and 254 secured to the frame by bolt and slot connections 256. Gage 254 is bent in the shape shown in Fig. 10 to increase its resilience so that the gages may if necessary be separated slightly by the insertion of the leatherboard. Co-operating with gages 252 and 254 are rear gage members 258 which, as shown in Fig. 11, are mounted in a lever 260 carried by rock shaft 262. Gage members 258 slide in the head of lever 260 for adjustment relatively to the anvils 250 and are clamped in adjusted position by plungers 264 which are cammed apart by the cone-shaped end of set screw 266. These gage members also perform the function of ejecting the finished work from the machine and for this purpose the rock shaft 262 is oscillated at the proper time by an arm carried thereby on which is mounted a cam roll engaging a suitable cam on shaft 26 as described in the above-identified patent.

Drivers 270 are provided in alinement with anvils 250 and are carried by a head 272 which is formed at its opposite ends into slides 274 reciprocating vertically in ways formed in the frame of the machine, as shown in Fig. 1. Pivotally attached to the slides 274 are links 276 connected to levers 278 carrying cam rolls 280 running in face cams 282 one of which is shown in Fig. 1. By this means the drivers 270 are reciprocated once for each revolution of shaft 26. The slides 274 are formed with slots in which move secondary slides 290 pressed downward by coil springs 292. Plungers 294 are clamped in these slides by set screws 296 so that they may be laterally adjusted according to the length of the stiffeners, and these plungers carry stiffener supports 298 which are clamped therein by set screws 300. Adjustable abutments 302 on the lower side of slides 290 are arranged to be engaged by surfaces 304 on the lower portions of slides 274. Slides 274 and 290 are connected by toggle members 306 carrying cam rolls 308 which are held against stationary cam members 310 by the pressure of springs 292 as explained, in my above-identified patent, According to the present invention, the stiffener supports 298 are adjusted to be in alinement with but slightly below the ways 96 at the time a stiffener is fed from the ways on to the supports (Fig. 12). This slight difference in level is necessary to insure that the stiffener will not catch on the sides of the supports 298. However, as the stiffener is under tension maintained by the ways 96 against the bearing member 72, if the supports 298 are below the ways 96 when the stiffener reaches them, the ends of the stiffener will snap downward against them with a force which is sometimes sufficient to jar the tacks out of the perforations. To avoid this I have improved the timing and adjustment of these parts by arranging that immediately after the forward edge of the stiffener has passed off the ways 96 on to the support 298, cams 282 will reciprocate links 276 slightly upward so that the surfaces 304, engaging abutments 302, will lift slides 290 slightly against the tension of springs 292, thereby lifting the stiffener smoothly off the ways 96 without allowing any release in its tension. Immediately thereafter the links 276 are carried downwardly, reciprocating the slides 274 and bringing the cam rolls 308 in engagement with the stationary cam members 310, thereby straightening the toggles 306. By this means the downward movement of slides 290 is arrested until toggles 306 are fully straightened at which time the drivers 270 have engaged the stiffener to maintain the tension theretofore existing against bearing member 72. The stiffener is therefore held by its own spring tension between supports 298 and drivers 270 as it moves downwardly. Further movement of slides 274 carries drivers 270 and supports 298 downward until the tacks are driven into the leatherboard on the anvils 250 and are clinched against the anvils. When the supports 298 and the drivers 270 have moved slightly upward to release the pressure against anvils 250, the rear gage members 258 are swung forward to eject the finished shank stiffener.

Figures 9, 13:
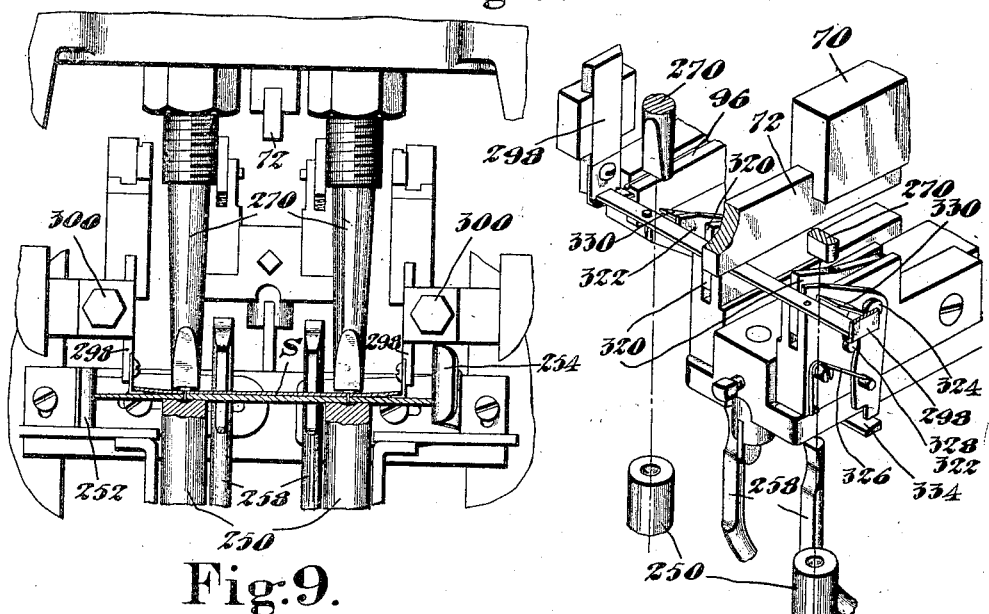

The stiffeners are pushed from ways 96 on to the supports 298 by spring pressed pawls 320 carried by slide 120, as shown in Figs. 12 to 15. As previously explained, it is desired to prevent the feeding of stiffeners into alinement with drivers 270 in this way unless there is a tack in each perforation of the stiffener. For this purpose novel feed mechanism is provided, comprising safety feed pawls 322 to act on stiffeners which do not have tacks, these pawls being sufficiently in advance of the regular feed pawls 320 to push the stiffeners beyond alinement with the drivers 270 as shown in Figs. 13 and 15. These safety pawls are rocked upwardly about pivots 324 by springs 326 as far as permitted by stop pins 328. Each of the pawls 322 has a cam surface 330 formed thereon in position to engage the points of the tacks in the perforations of a stiffener on the rearward or idle stroke of slide 120. The tacks are prevented from coming out of the perforations in the stiffener under the pressure of cam surfaces 330 by members 332 carried by support 76. If both of the pawls 322 are rocked about pivots 324 by engagement of surfaces 330 with the tacks in a stiffener, a catch 334 is swung by a leaf spring 336 into engagement with notches in the lower ends of the pawls and the pawls are thereby locked down in a position where they will not engage the stiffener on the next forward reciprocation of slide 120, so that the feeding will be done by pawls 320 which will bring the stiffener with its perforations in alinement with drivers 270.

If, however, both of them are not thus rocked by engagement of surfaces 330 with tacks, the one which remains in upper position, or both safety pawls if neither engages a tack, will prevent operation of catch 334, so that pawls 322 will feed the stiffener instead of pawls 320, placing it out of alinement with drivers 270, as shown in Figs. 13 and 15. Catch 334 is released on each forward movement of slide 120 by engagement with a swinging trip member 338.

In operation, at each rearward reciprocation of slides 70 and 120, one end of the lowermost stiffener is pushed off ledge 36 by finger 38, two tacks are released from the respective chutes 180 and fall into the corresponding perforations in a stiffener on the ways 96 beneath them, and supports 298 and drivers 270 descend to fasten a stiffener to a piece of leatherboard. On the reverse motion of the slides, each stiffener is fed forward one step, two tacks are delivered into chutes 180 by the corresponding escapements, and a stiffener is fed from ways 96 to supports 298, in alinement with drivers 270 if there is a tack in each perforation and out of alinement therewith if there is not.

While my invention has been described as embodied in a machine for tacking steel stiffeners to leatherboard or leather shank pieces, it is not my intention to limit its scope thereby, or otherwise than by the terms of the appended claims.

Having thus described my invention, what I claim as new and desire to secure by Letters Patent of the United States is:

1. In a shank-making machine, in combination, co-operating driving and work-supporting members, and power-actuated means organized and operating to present stiffeners upon the work-supporting members in alinement with the driving member if there are fastenings properly associated with the stiffeners and upon the work-supporting members but out of alinement with the driving member if fastenings are not properly associated with the stiffeners.

2. In a machine of the class described, in combination, a source of supply of perforated blanks, means to deliver a succession of blanks therefrom, means to introduce headed fastenings in the perforations of the blanks, co-operating driving and work-supporting members, and feeding mechanism comprising a member to feed a given blank into alinement with said driving and work-supporting members if a fastening is in the perforation thereof and a different member to feed the blank into a position out of alinement with said members if there is no fastening in the perforation.

3. In a machine of the class described, in combination, means to present perforated blanks with headed fastenings in the perforations, means to drive the fastenings into a piece of work, a member to feed the blanks successively from the presenting means into operative relation with the driving means and a safety device to feed past the driving means those blanks which do not have fastenings in the perforations.

4. In a machine of the class described, in combination, means to present perforated blanks having headed fastenings in the perforations, fastening-driving means, a plurality of feeding members, and means to render one of said members operative when a blank is presented which has a fastening in its perforation, and a different one of said members operative when a blank is presented which does not have a fastening in its perforation, the first of said members being arranged to place the blank in operative relation to said driving means, and the second being arranged to eject the blank.

5. In a machine of the class described, in combination, means to present blanks perforated at each end, means to place fastenings in the perforations thereof, driving means, feeding means, and auxiliary means controlled by the presence of fastenings in both perforations of a given blank for rendering the feeding means effective to place that blank in position to be acted upon by said driving means.

6. In a machine of the class described, in combination, means to present blanks having a plurality of perforations, means to place a headed fastening in each perforation, driving means, a member to feed the blanks successively into inoperative position relative to said driving means, and means controlled by the presence of a fastening in each of said plurality of perforations in a given blank to render said feed member inoperative as to that particular blank.

7. In a machine of the class described, in combination, a slide to feed perforated blanks, a feed pawl on the slide having a cam surface to be engaged by the shank of a fastening in a perforation of a blank fed thereby, and a catch to hold the pawl in inoperative position when cammed aside by engagement with the fastening.

8. A machine as defined by claim 7, in combination with means to release the catch after the feeding of each blank.

9. In a machine which has means to present blanks perforated at each end, and means to introduce fastenings into the perforations in the blanks, in combination, means to eject the blanks, and means controlled by the absence of a fastening in either or both of the perforations in a blank and operating simultaneously on both ends of the blank for rendering said ejecting means operative.

10. In a machine of the class described, ways to support blanks, a pair of pivotally-mounted reciprocating feed pawls, a cam surface on each pawl to be engaged by members associated with a blank on the idle or return stroke of the pawls, and a single spring-pressed catch to snap under and hold the pawls in inoperative position if both of them are cammed down by the corresponding members but to be held out of locking position by engagement with either pawl, or with both pawls, if not so cammed down.

11. A machine as defined by claim 10, in combination with supplementary pawls to feed the blanks when the feed pawls are held in inoperative position by the catch.

12. A machine as defined by claim 10, in combination with means to support the members against the thrust of the cam surfaces.

13. A machine as defined by claim 10, in combination with a trip to release the catch on each return stroke of the pawls.

14. In a machine of the class described, in combination, ways to support blanks, vertically-reciprocable supports for the end of a blank normally in alinement with but slightly below the ways, means to push blanks successively off the ways on to the supports, and means to raise the supports as each blank is pushed thereupon to lift it smoothly from the ways.

15. In a machine of the class described, in combination, co-operative work-supporting and fastening-driving members, including thin fingers for supporting a blank while it is secured to a piece of work, an edge gage member to position a piece of work on the work-supporting member, means to adjust the edge-gage member for different sizes of pieces of work, and means to move said edge-gage member to push the fastened blank and work off the thin supporting fingers.

16. In a machine of the class described, in combination, step-by-step means for feeding blanks perforated at each end, means for delivering a single tack at each end of a blank and placing it in the perforation at that end thereof at one step of the feeding, a stationary work-support, adjustable gages for positioning work thereon, a movable blank support to place a blank against the work on the support, and movable drivers to drive the tacks in the perforations of the blank into the work.

17. In a machine of the class described, in combination, ways for supporting blanks perforated at each end, a device to feed blanks step-by-step along said ways, sources of supply of tacks, a pair of means to separate tacks one from each source and introduce them into the perforations of the blanks at one step of the feeding, an adjustable support for each source and its corresponding means, and means to vary the positions of the supports with respect to the corresponding position of rest of the blanks to place different sizes of blanks in operative position relatively to the tack-introducing means.

18. In a machine of the class described, in combination, ways to support blanks, and thin movable fingers to push blanks therealong, said fingers being inclined laterally relatively to the plane of blanks supported by the ways so that they will feed blanks which are twisted or beveled at the feeding edge.

19. In a machine of the class described, in combination, a source of supply of tacks, means to impart intermittent feed movements to a series of perforated blanks arranged one ahead of another to advance said series in a continuously-forward direction, and means operable at each pause in the intermittent feed to separate a single tack from the source of supply for each perforation in the particular blank which has reached a given stage in the intermittent feeding motion and to introduce the tack so separated into the corresponding perforation.

20. In a machine of the class described, in combination, separated parallel ways, means to suspend a headed fastening above and in predetermined lateral relation to each of said ways, fingers successively to push perforated blanks along the ways under the fastening-suspending means, and means to release the fastenings to allow them to drop into the perforations in the blanks.

21. In a machine of the class described, in combination, a source of supply of perforated blanks at the rear of the machine, a feed device to place fastenings in the perforations of the blanks as they pass through the machine, means at the front of the machine to drive the fastenings into work presented by an operator, and means controlled by the operator from the front of the machine for clearing the feed device if it becomes clogged.

22. In a machine of the class described, in combination, a feed device for fastenings comprising a hinged side, and a manually-controlled lever to swing the hinged side open to clear the feed device when it becomes clogged.

23. In a machine of the class described, in combination, a chute for headed fastenings, comprising jaws spring-pressed together to hold a single fastening head uppermost, means to deliver fastenings singly thereto, means to position a perforated article with its perforation directly below the chute, and means to open the jaws of the chute to drop a fastening therein into the perforation of an article therebelow.

24. In a machine of the class described, in combination, step-by-step means for feeding perforated blanks, a support for a headed fastening directly above the perforation in a blank during a pause in its feed, and mechanism operative when a blank is at rest below the support to release a fastening from the support to permit it to drop into the perforation of the blank.

25. In a machine of the class described, in combination, a chute comprising two parts held together by a spring, a raceway terminating above the chute, separating means to deliver fastenings singly from the raceway into the chute, means to open the chute to drop a fastening therein directly into a perforation in an article therebelow, and mechanism to actuate the separating means and the chute-opening means alternately.

26. A machine as defined by claim 25, in combination, with manually-controlled means for opening the chute independently of the mechanically-controlled chute-opening means.

27. In a machine of the class described, in combination, a source of supply of tacks, a raceway, means to deliver tacks from the source of supply into the raceway, an escapement at the bottom of the raceway to deliver tacks therefrom, a tack-centering chute below the raceway to guide tacks delivered therefrom, means intermittently to place perforated articles below the chute, and timed mechanism to release a tack through the chute when an article is at rest therebelow to direct the shank of the tack into the perforation in the article and thereafter to release the head of the tack.

28. In a machine of the class described, in combination, a chute formed of two levers, each bearing one half of the chute at one end and a bearing surface at the other, a spring forcing the halves of the chute together and the bearing surfaces apart, means intermittently to deliver fastenings singly into the chute, and a cam member operable during the pauses of said intermittent delivery to force the bearing surfaces of the levers together and thereby to open the chute and release the fastening therein.

29. In a machine of the class described, in combination, a raceway for tracks, a pair of pivotally-mounted spring-held escapement fingers associated therewith, and a reciprocating slide rocking said fingers against the tension of their springs and operating them alternately one on each movement of the slide as it reciprocates back and forth.

30. A machine as defined by claim 29, in combination with a receptacle below the end of the raceway to receive the tacks released by the escapement fingers, and means operated by movement of the slide in one direction to deliver the tacks from the receptacle.

31. In a machine of the class described, in combination, a blank support, means to advance a succession of blanks along said support, a device to associate fastenings with the blanks on the support, and means to adjust said device laterally and longitudinally of the support.

32. In a machine of the class described, in combination, parallel ways, means to advance a succession of perforated blanks step-by-step along the ways, mechanism to deliver a tack for each perforation of a blank, and means to adjust said mechanism to vary the position where the tacks are delivered, laterally and longitudinally with respect to the ways, according to the position of the perforations in the blanks during a pause in their advance along the ways.

33. In a machine of the class described, in combination, means intermittently to advance a succession of perforated blanks, and independent unitary devices organized and arranged to deliver a single fastening for each perforation in a blank, each of said devices being independently adjustable in two directions relatively to a position of rest of the blanks to associate the fastenings delivered thereby with perforations in different kinds of blanks.

34. In a machine of the class described which has means for advancing a succession of perforated blanks, in combination, mechanism to deliver a single fastening for each blank and to associate the fastening with a perforation in the blank, a plate on which said mechanism is mounted, and a support for the plate, said plate and said support being constructed and arranged for relative adjustment in two directions.

35. In a machine of the class described, in combination, a support for a perforated article, a tack-centering guide immediately above the perforation in an article on the support, said guide and the position of an article on the support being relatively adjustable for different sizes of articles and different positions of perforations, means to deliver tacks singly so that the shank of each tack will be directed by the guide into a perforation, and means to open the guide to release the heads of the tacks.

In testimony whereof I have signed my name to this specification.

BRADFORD B. WATERMAN.